(12) United States Patent
Iyer et al.

(10) Patent No.: US 9,384,309 B2
(45) Date of Patent: Jul. 5, 2016

(54) GLOBAL TIMING MODELING WITHIN A LOCAL CONTEXT

(75) Inventors: Mahesh A. Iyer, Fremont, CA (US); Amir H. Mottaez, Los Altos, CA (US); Rajnish K. Prasad, Milpitas, CA (US)

(73) Assignee: SYNOPSYS, INC., Mountain View, CA (US)

( * ) Notice: Subject to any disclaimer, the term of this patent is extended or adjusted under 35 U.S.C. 154(b) by 709 days.

(21) Appl. No.: 12/783,915

(22) Filed: May 20, 2010

(65) Prior Publication Data

US 2011/0289464 A1 Nov. 24, 2011

(51) Int. Cl.
*G06F 17/50* (2006.01)

(52) U.S. Cl.
CPC .......... *G06F 17/5031* (2013.01); *G06F 17/505* (2013.01); *G06F 17/5045* (2013.01); *G06F 2217/08* (2013.01); *G06F 2217/84* (2013.01)

(58) Field of Classification Search
None
See application file for complete search history.

(56) References Cited

U.S. PATENT DOCUMENTS

| | | | | |
|---|---|---|---|---|
| 4,263,651 A | * | 4/1981 | Donath et al. | 716/108 |
| 5,381,524 A | * | 1/1995 | Lewis et al. | 715/804 |
| 5,576,979 A | * | 11/1996 | Lewis et al. | 716/102 |
| 5,790,435 A | * | 8/1998 | Lewis et al. | 716/102 |
| 6,058,252 A | * | 5/2000 | Noll et al. | 716/113 |
| 6,272,668 B1 | * | 8/2001 | Teene | 716/113 |
| 6,795,951 B2 | * | 9/2004 | Hathaway et al. | 716/108 |
| 7,020,589 B1 | * | 3/2006 | Datta Ray et al. | 703/2 |
| 7,181,713 B2 | * | 2/2007 | Schultz | 716/108 |
| 7,243,323 B2 | * | 7/2007 | Williams et al. | 716/113 |
| 7,784,020 B2 | * | 8/2010 | Izuha et al. | 716/52 |
| 8,418,116 B2 | * | 4/2013 | Walker et al. | 716/132 |
| 8,539,413 B1 | * | 9/2013 | Singla et al. | 716/113 |
| 2002/0083398 A1 | * | 6/2002 | Takeyama et al. | 716/1 |

* cited by examiner

*Primary Examiner* — A. M. Thompson
(74) *Attorney, Agent, or Firm* — Park, Vaughan, Fleming & Dowler LLP; Laxman Sahasrabuddhe

(57) ABSTRACT

Some embodiments of the present invention provide techniques and systems for determining and using margin values. An arrival time at an output pin of a logic gate can be determined. Next, required times at the output pin of the logic gate can be determined. Each required time can be associated with a timing end-point in a path-group, affected by that pin. The system can then determine a first set of slack values at the output pin of the logic gate by computing a difference between the required times and the arrival time. Next, the system can determine a set of margin values at the output pin of the logic gate by computing a difference between the first set of slack values and a second set of slack values at the timing end-points in the path-groups. Next, the system can use the set of margin values to optimize the logic gate.

20 Claims, 6 Drawing Sheets

GLOBAL TIMING MODELING WITHIN A LOCAL CONTEXT

BACKGROUND

1. Technical Field

This disclosure relates to electronic design automation (EDA). More specifically, this disclosure relates to methods and apparatuses for global timing modeling within a local context.

2. Related Art

Conventional circuit optimization techniques update timing of the entire design (e.g., from timing start-points to timing end-points) whenever a logic gate is changed. Updating arrival and required times for the entire design is computationally expensive. As a result, the timing update operation often becomes a runtime bottleneck in conventional synthesis optimization systems (e.g., logic synthesis and physical synthesis).

To combat the runtime bottleneck problem, conventional techniques typically impose a time limit on the optimization process. Although this approach ensures that the optimization process is guaranteed to terminate within the predetermined amount of time, it results in poor Quality-of-Results (QoR). Hence, what is needed are efficient circuit optimization techniques which produce good QoR, without incurring a lot of computational runtime.

SUMMARY

Some embodiments of the present invention provide techniques and systems for determining margin values. In some embodiments, the system can determine an arrival time at an output pin of a logic gate. Next, the system can determine one or more required times at the output pin of the logic gate. Each required time can be associated with a timing end-point in a path-group, that is affected by the output pin. The system can then determine a slack value at the output pin of the logic gate by computing a difference between a required time and the arrival time. Next, the system can determine margin values at the output pin of the logic gate by computing a differences between the slack values at the output pin of the logic gate and the corresponding slack values at the timing end-points. Each margin value (corresponding to each required time at the output pin of the logic gate and each timing endpoint affected by the output pin) determines the extent to which a local change on the output pin affects the global timing of the corresponding endpoints of the design.

Once computed, the margin values can be used for optimizing a circuit design. Specifically, the system can select an optimization transformation which improves a non-timing metric in a local context, and which does not degrade timing at the output pin of the logic gate by an amount that is greater than the margin values. The non-timing metric can relate to any characteristic of a circuit design which is desired to be optimized. For example, the non-timing metric can be indicative of an amount of area required by the circuit design, an amount of leakage power consumed by the circuit design, and/or an amount of electrical design rule violations in the circuit design. If the optimization transformation does not degrade timing by an amount that is greater than a margin value, the optimization transformation may be accepted. Alternatively, the system can evaluate the selected transformation in larger contexts, e.g., within a zone or a global context. The system may accept the transformation (e.g., by committing the transformed logic gate to the design) if applying the transformation does not degrade timing metrics in one or more larger context, e.g., one of the zones or the global context. On the other hand, if the optimization transformation degrades timing by an amount that is greater than at least one margin value, the system may reject the transformation.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
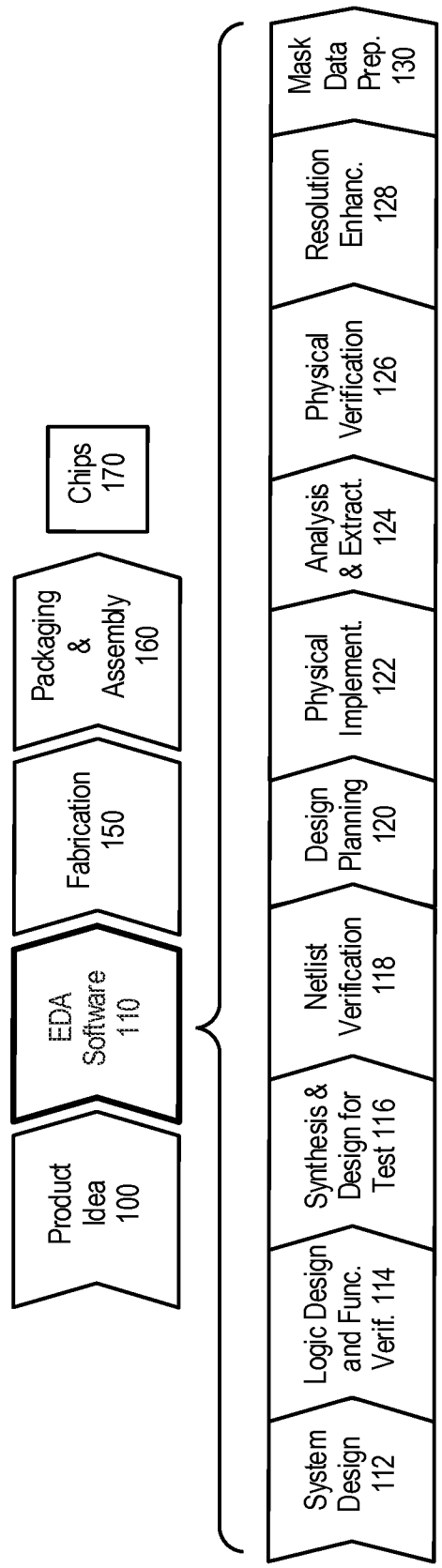
FIG. 1 illustrates various steps in the design and fabrication of an integrated circuit.

FIG. 1 illustrates various steps in the design and fabrication of an integrated circuit. The process starts with a product idea 100, which is realized using Electronic Design Automation (EDA) software 110. Chips 170 can be produced from the finalized design by performing fabrication 150 and packaging and assembly 160 steps.

A design flow that uses EDA software 110 is described below. Note that the design flow description is for illustration purposes only, and is not intended to limit the present invention. For example, an actual integrated circuit design may require a designer to perform the design flow steps in a different sequence than the sequence described below.

In the system design step 112, the designers can describe the functionality to implement. They can also perform what-if planning to refine the functionality and to check costs. Further, hardware-software architecture partitioning can occur at this step. In the logic design and functional verification step 114, a Hardware Description Language (HDL) design can be created and checked for functional accuracy.

In the synthesis and design step 116, the HDL code can be translated to a netlist, which can be optimized for the target technology. Further, tests can be designed and implemented to check the finished chips. In the netlist verification step 118, the netlist can be checked for compliance with timing constraints and for correspondence with the HDL code.

In the design planning step 120, an overall floor plan for the chip can be constructed and analyzed for timing and top-level routing. Next, in the physical implementation step 122, placement and routing can be performed.

In the analysis and extraction step 124, the circuit functionality can be verified at a transistor level. In the physical verification step 126, the design can be checked to ensure correctness for manufacturing, electrical issues, lithographic issues, and circuitry.

In the resolution enhancement step 128, geometric manipulations can be performed on the layout to improve manufacturability of the design. Finally, in the mask data preparation step 130, the design can be taped-out for production of masks to produce finished chips.

Figure 2:
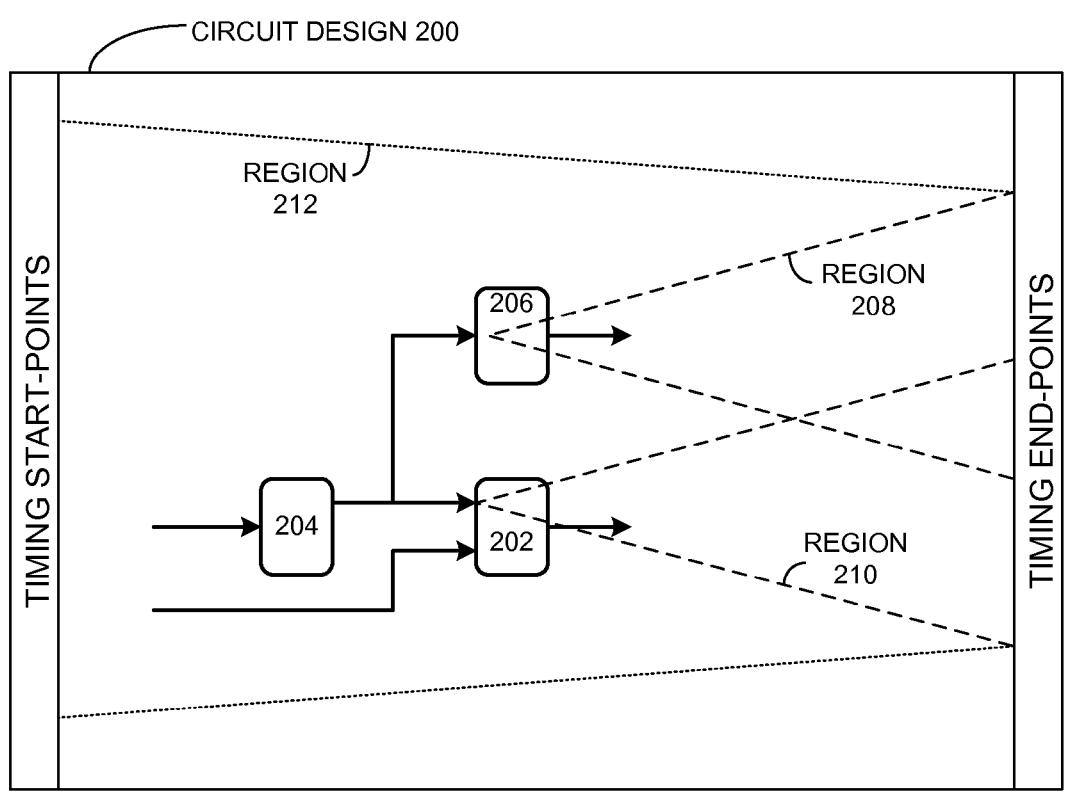
FIG. 2 illustrates how timing information can be propagated in a circuit design.

FIG. 2 illustrates how timing information can be propagated in a circuit design.

Circuit design 200 can be part of a larger circuit design. A timing start-point or end-point can generally be any point in a circuit design where one or more timing requirements need to be satisfied. Specifically, a timing start-point can be a register output or a primary input, and a timing end-point can be a register input or a primary output.

Circuit design 200 includes logic gate 202. Applying an optimization transformation to logic gate 202 can change the capacitive load on logic gate 204, which can change the arrival and transition times at logic gate 204's output, logic gate 202's input, and logic gate 206's input. These changes can ripple through regions 208 and 210 to the timing end-points of circuit design 200. This, in turn, can cause the required times in the entire fan-in cones of these timing end-points to be out-of-date. Hence, after propagating the timing information in the forward direction, conventional systems typically propagate required times in the backward direction, e.g., backward along region 212 to the timing start-points. Further details on static timing analysis and propagation of timing information can be found in Luciano Lavagno (Editor), Louis Scheffer (Editor), Grant Martin (Editor), *EDA for IC Implementation, Circuit Design, and Process Technology (Electronic Design Automation for Integrated Circuits Handbook)*, CRC Press, 1$^{st}$ Ed., March 2006.

Some techniques ensure that the slack values at the timing-end-points do not degrade during optimization. Specifically, an optimization transformation can be tentatively applied to a logic gate. Next, new slack values can be computed for timing end-points. The optimization transformation can be accepted if the slack values at the timing end-points do not degrade. If the slack values at the timing-end-points degrade, the optimization transformation can be rejected. Unfortunately, such techniques can be inefficient because it is often computationally impractical to globally update timing information (e.g., all the way to the timing end-points) for each candidate transformation.

Some techniques create a local context around a logic gate, and use the local context to filter out optimization transformations that degrade timing metrics in the local context. Specifically, for each candidate circuit optimization transformation, the timing information is updated only in the local context. If the timing metrics degrade in the local context, the system rejects the optimization transformation. If the timing metrics do not degrade, the system can propagate timing to the timing end-points, and accept the optimization transformation if the global timing metrics (e.g., timing metrics at the timing end-points) do not degrade. Unfortunately, filtering out transformations using timing metrics based on local timing information can cause the system to miss good optimization opportunities. Specifically, it is possible for an optimization transformation to degrade timing in the local context, but not in the global context. For example, a local optimization transformation that improves cell area may degrade timing metrics within the local context, but those timing degradations may not be observable at the timing end-points, because the worst timing at those end-points are dominated by other paths in the design. In such situations, if the optimization transformation is filtered out in the local context, then the system may miss a good optimization opportunity.

Some embodiments of the present invention overcome the above-described drawbacks by providing systems and techniques for modeling global timing in the local context. The global timing information can be used to make better decisions for rejecting and/or accepting optimization transformations in the local context. Specifically, in some embodiments, one or more margin values are computed for an output pin of a logic gate which is desired to be optimized. Each margin value is associated with a timing end-point in a path-group, and indicates an amount of timing degradation at the logic gate's output pin which is unobservable at the timing end-point in the path-group. In other words, if the timing at the logic gate's output pin degrades by an amount that is less than the margin value, the timing at the associated timing end-point in the path-group is not likely to degrade. The margin information enables the system to try a larger number of optimization transformations in the local context, which results in better QoR.

Embodiments of the present invention can be used with any optimization technique that uses local-context computations to filter out optimization transformations. For example, an optimization technique can try a number of optimization transformations in the local context and select an optimization transformation that does not degrade timing by an amount that is greater than the margin. Next, the system can optionally check if the selected optimization transformation degrades timing in a zone around the logic gate. If the selected optimization transformation does not degrade timing in the zone, the system can then optionally check if the selected optimization transformation degrades timing in a larger zone (if the system is using a hierarchy of zones) or in the global context. If the optimization transformation does not degrade timing in the global context, the system can apply the optimization transformation to the logic gate. In this manner, the system can use the margin information to substantially speed up the optimization process without missing good optimization opportunities.

FIGS. 3A-3D illustrate how margin values can be determined in accordance with some embodiments of the present invention. Circuit design 300 can be part of a larger circuit design. Circuit design 300 includes circuit blocks 302, 304, 306, 308, and 310. A circuit block can generally be any portion of the circuit with one or more inputs and one or more outputs. Specifically, a circuit block can be a logic gate.

Figure 3A:
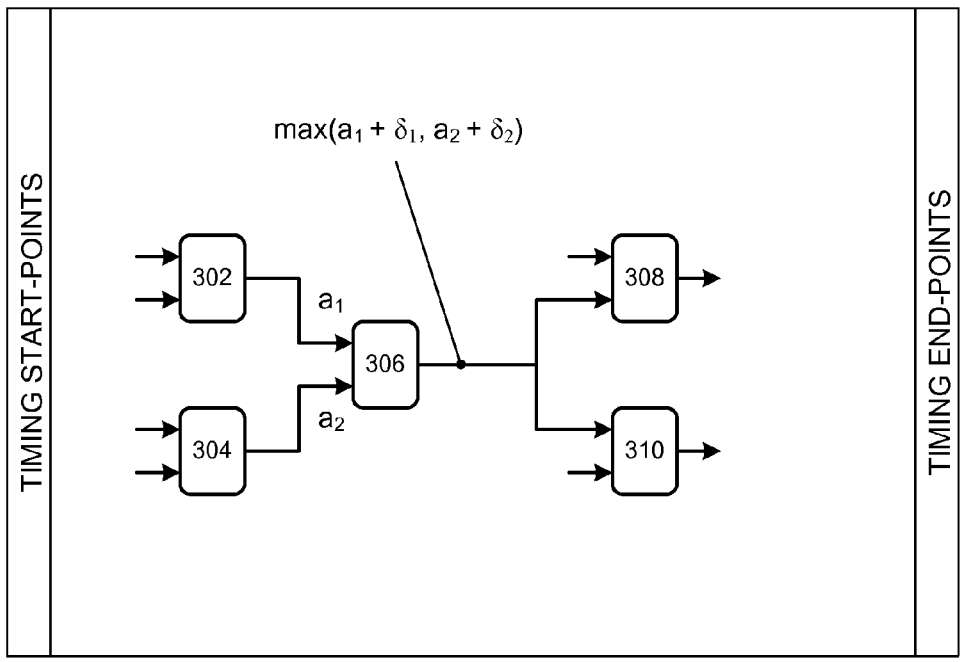
FIG. 3A illustrates how arrival times can be propagated in accordance with some embodiments of the present invention.

FIG. 3A illustrates how arrival times can be propagated in accordance with some embodiments of the present invention.

As mentioned before, arrival times at the timing start-points are propagated toward the timing end-points. For example, suppose the arrival times at the inputs of circuit block 306 are $a_1$ and $a_2$. The arrival times can be propagated to the output pin of circuit block 306 as follows. First, delays $\delta_1$ and $\delta_2$ can be added to arrival times $a_1$ and $a_2$, respectively. Delays $\delta_1$ and $\delta_2$ represent the delay experienced by a signal as it traverses from the top and bottom inputs, respectively, of circuit block 306 to the output pin of circuit block 306. Next, the arrival times can be merged by selecting the worst-case arrival time. When timing analysis is performed to identify setup violations, the worst-case arrival time is the maximum arrival time. On the other hand, when timing analysis is performed to identify hold violations, the worst-case arrival time is the minimum arrival time. In the timing propagation example illustrated in FIGS. 3A-3D, timing analysis is being performed to identify setup violations. Hence, as shown in FIG. 3A, the worst-case arrival time at the output pin of circuit block 306 is equal to the maximum of $(a_1+\delta_1)$ and $(a_2+\delta_2)$. The arrival times can be propagated to the timing end-points in this manner.

Figure 3B:
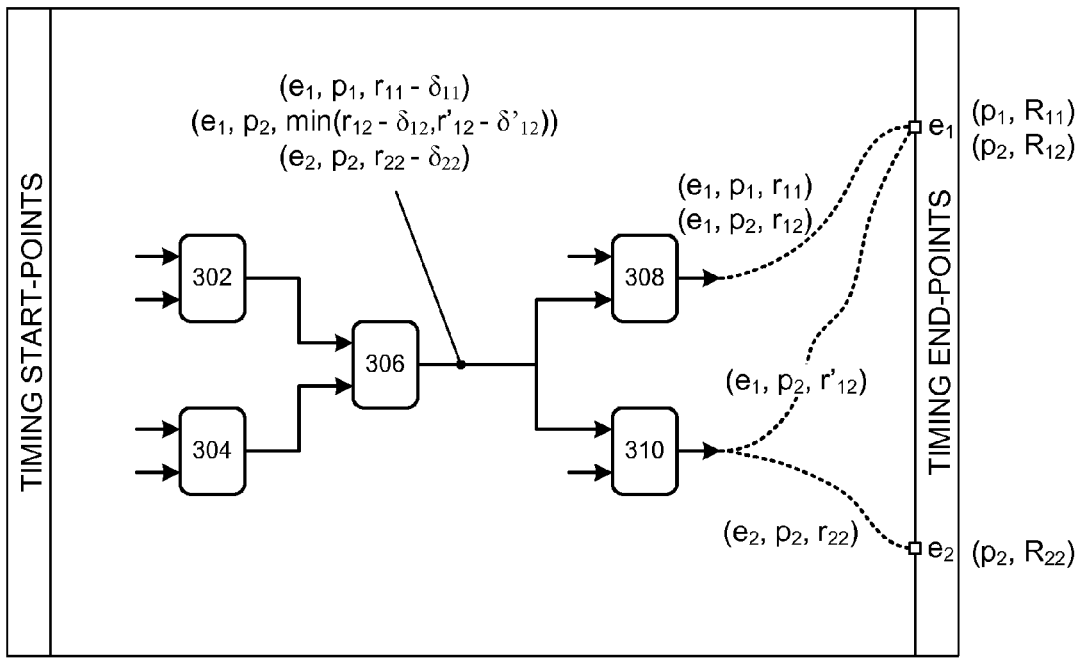
FIG. 3B illustrates how required times can be propagated in accordance with some embodiments of the present invention.

FIG. 3B illustrates how required times can be propagated in accordance with some embodiments of the present invention. Each required time can be associated with a timing end-point in a path-group. A timing end-point can have different required times for different path-groups. For example, required times $R_{11}$ and $R_{12}$ at end-point $e_1$ are associated with path-groups $p_1$ and $p_2$, respectively.

Suppose required times $R_{11}$ and $R_{12}$ are propagated from end-point $e_1$ along the dotted line to the output pin of circuit block 308. Note that it is possible for required times $R_{11}$ and $R_{12}$ to be propagated back along different paths, but they have been shown to be propagated along the same path in FIG. 3B for the sake of clarity. Let $r_{11}$ and $r_{12}$ denote the required times at the output pin of circuit block 308. The 3-tuple $(e_1, p_1, r_{11})$ indicates that $r_{11}$ is associated with end-point $e_1$ in path-group $p_1$, and the 3-tuple $(e_1, p_2, r_{12})$ indicates that required time $r_{12}$ is associated with end-point $e_1$ in path-group $p_2$.

Similarly, suppose required times $R_{12}$ and $R_{22}$ are propagated back from end-points $e_1$ and $e_2$, respectively, along the dotted lines to the output pin of circuit block 310. Let $r'_{12}$ and $r_{22}$ denote the required times at the output pin of circuit block 310. Note that required time $r'_{12}$ can be different from required time $r_{12}$ because they are propagated along different paths. The 3-tuple $(e_1, p_2, r'_{12})$ indicates that $r'_{12}$ is associated with end-point $e_1$ in path-group $p_2$, and the 3-tuple $(e_2, p_2, r_{22})$ indicates that required time $r_{22}$ is associated with end-point $e_2$ in path-group $p_2$.

The required times at the outputs of circuit blocks 308 and 310 can be propagated to the inputs as follows. First, delays $\delta_{11}$, $\delta_{12}$, $\delta'_{12}$, and $\delta_{22}$ can be subtracted from required times $r_{11}$, $r_{12}$, $r'_{12}$, and $r_{22}$, respectively. Delays $\delta_{11}$ and $\delta_{12}$ can represent the delay experienced by a signal as it traverses from a corresponding input of circuit block 308 to the output pin of circuit block 308. Delays $\delta'_{12}$ and $\delta_{22}$ can represent the delay experienced by a signal as it traverses from a corresponding input of circuit block 310 to the output pin of circuit block 310.

Next, the required times can be merged by selecting the worst-case required time associated with a particular end-point in a particular path-group. When timing analysis is performed to identify setup violations, the worst-case required time is the minimum required time. When timing analysis is performed to identify hold violations, the worst-case required time is the maximum required time. The timing analysis in FIGS. 3A-3D is for identifying setup violations. Hence, as shown in FIG. 3B, the worst-case required times at the output pin of circuit block 306 are as follows: $(e_1, p_1, r_{11}-\delta_{11})$, $(e_1, e_2, \min(r_{12}-\delta_{12}, r'_{12}-\delta'_{12}))$, and $(e_2, p_2, r_{22}-\delta_{22})$.

Note that the required time associated with end-point $e_1$ in path-group $p_1$ is propagated across circuit block 308 without any merging because that is the only required time value associated with end-point $e_1$ in path-group $p_1$. The same is true with the required time associated with end-point $e_2$ in path-group $p_2$, i.e., the required time associated with end-point $e_2$ in path-group $p_2$ is propagated across circuit block 310 without any merging. However, there are two required time values associated with end-point $e_1$ in path-group $p_2$. Hence, these two required time values are merged and the minimum of the two required time values is propagated. Required times can be propagated to the timing start-points in this manner.

Figure 3C:
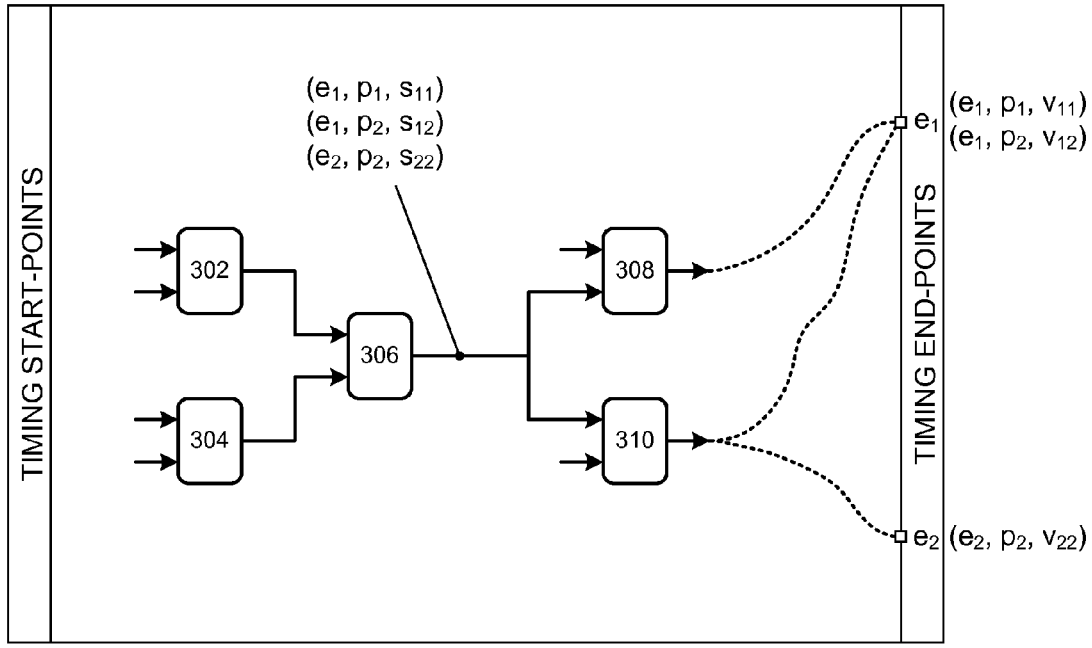
FIG. 3C illustrates slack values in accordance with some embodiments of the present invention.

Once the arrival times and the required times have been computed, the system can then compute the slacks and the margins. FIG. 3C illustrates slack values in accordance with some embodiments of the present invention.

Just like required times, each slack value is associated with a timing end-point in a path-group. Specifically, to compute the slack values associated with a pin, the system can subtract the arrival time from the required times. For example, the output pin of circuit block 306 can have three slack values $s_{11}$, $s_{12}$, and $s_{22}$. The 3-tuples $(e_1, p_1, s_{11})$, $(e_1, p_2, s_{12})$, and $(e_2, p_2, s_{22})$ represent the association between the slack values and the timing end-points in the path-groups. The three slack values can be computed as follows: $s_{11}=(r_{11}-\delta_{11})-\max((a_1+\delta_1), (a_2+\delta_2))$; $s_{12}=\min(r_{12}-\delta_{12}, r'_{12}-\delta'_{12})-\max((a_1+\delta_1), (a_2+\delta_2))$; and $S_{22}=(r_{22}-\delta_{22})-\max((a_1+\delta_1), (a_2+\delta_2))$. Recall that $a_1$ and $a_2$ are the arrival times at the inputs of circuit block 306, and delays $\delta_1$ and $\delta_2$ represent the delay experienced by a signal as it traverses from the top and bottom inputs, respectively, of circuit block 306 to the output pin of circuit block 306.

Slack values can similarly be computed at the timing end-points. These slack values are shown in FIG. 3C as $v_{11}$, $v_{12}$, and $v_{22}$. Note that each timing end-point can have different slack values for different path-groups. The 3-tuples $(e_1, p_1, v_{11})$, $(e_1, p_2, v_{12})$, and $(e_2, p_2, v_{22})$ represent the association between the slack values and the timing end-points in the path-groups.

Figure 3D:
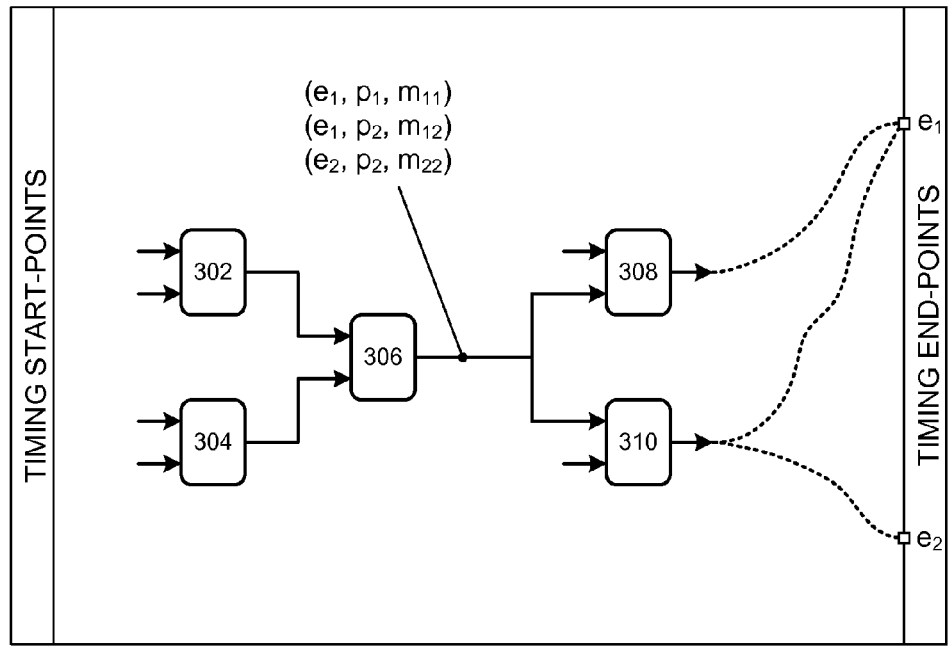
FIG. 3D illustrates margin values in accordance with some embodiments of the present invention.

Next, the margin value at an output can be computed by subtracting the slack value at the timing end-point from the slack value at the output. FIG. 3D illustrates margin values in accordance with some embodiments of the present invention.

Just like required times and slack values, each margin value is associated with a timing end-point in a path-group. The margin values at the output pin of circuit block 306 are shown in FIG. 3D as $m_{11}$, $m_{12}$ and $m_{22}$. The 3-tuples $(e_1, p_1, m_{11})$, $(e_1, p_2, m_{12})$, and $(e_2, p_2, m_{22})$ represent the association between the margin values and the timing end-points in the path-groups. The three margin values can be computed as follows: $m_{11}=s_{11}-v_{11}$; $m_{12}=s_{12}-v_{12}$; and $m_{22}=s_{22}-v_{22}$. A margin value of zero indicates that any change in the slack value at the output pin of the circuit block will affect the slack value at the associated end-point in the path-group. A positive margin value indicates the amount of timing degradation at the output pin of the circuit block which is not observable (i.e., which will not affect the slack value) at the associated end-point in the path-group. In some embodiments, the minimum margin value at an output pin can be determined by determining the minimum margin value at the output pin across all endpoints in all pathgroups. This minimum margin value represents the tightest constraint on the output pin. The system can use this minimum value to accept and/or reject a candidate circuit optimization transformation.

Figure 4:
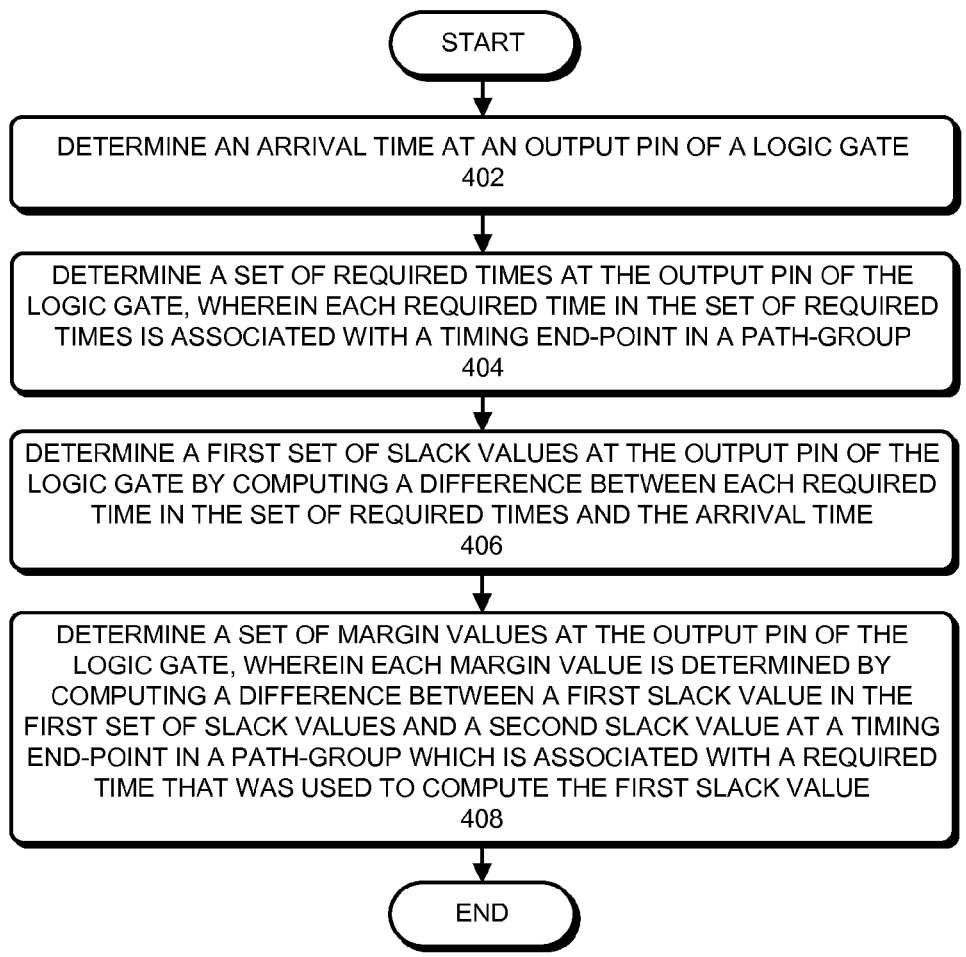
FIG. 4 presents a flowchart that illustrates a process for determining margin values in accordance with some embodiments of the present invention.

FIG. 4 presents a flowchart that illustrates a process for determining margin values in accordance with some embodiments of the present invention.

The process can begin by determining an arrival time at an output pin of a logic gate (step 402). As explained above, determining the arrival time at an output pin of a logic gate can involve determining a maximum arrival time in a set of arrival times which is propagated forward from a set of input pins of the logic gate to the output pin of the logic gate. If timing analysis is performed to identify hold violations, the system can determine the minimum arrival time instead of the maximum arrival time.

Next, the system can determine a set of required times at the output pin of the logic gate, wherein each required time in the set of required times is associated with a timing end-point in a path-group (step 404). As explained above, determining a required time associated with a timing end-point in a path-group at the output pin of the logic gate includes determining a minimum required time in a set of fan-out required times associated with the timing end-point in the path-group, wherein the set of fan-out required times is propagated backward from a set of fan-out gates electrically coupled to the output pin of the logic gate. If timing analysis is performed to identify hold violations, the system can determine the maximum required time instead of the minimum required time.

The system can then determine a first set of slack values at the output pin of the logic gate by computing a difference between each required time in the set of required times and the arrival time (step 406).

Next, the system can determine a set of margin values at the output pin of the logic gate, wherein each margin value is determined by computing a difference between a first slack value in the first set of slack values and a second slack value at a timing end-point in a path-group which is associated with a required time that was used to compute the first slack value (step 408).

In this manner, the system can keep track of required times, slack values, and margin values for each timing-end-point in each path-group, and compute multiple margin values at the output pins of logic gates that are candidates for optimization. Next, the system can use the margin values to optimize the logic gate. Specifically, for a given optimization transformation, the system can use the margin values at the output pin of a logic gate to determine the effect that the optimization transformation is expected to have on the slack values at the timing end-points in the path-groups.

Figure 5:
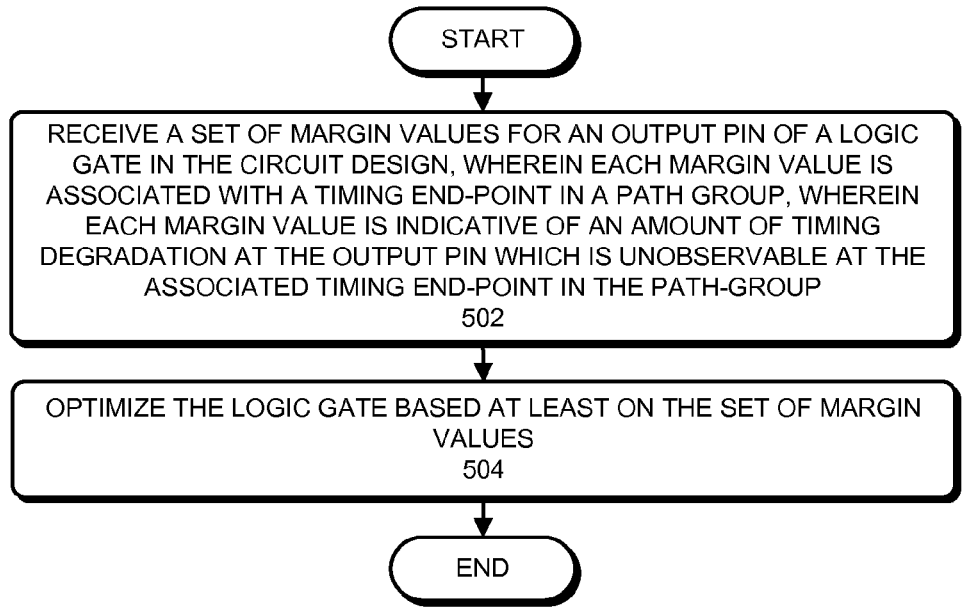
FIG. 5 presents a flowchart that illustrates a process for using margin values to optimize a circuit design in accordance with some embodiments of the present invention.

FIG. 5 presents a flowchart that illustrates a process for using margin values to optimize a circuit design in accordance with some embodiments of the present invention.

The process can begin by receiving a margin value for an output pin of a logic gate in the circuit design, wherein the margin value is indicative of an amount of timing degradation at the output pin which is unobservable at a timing end-point in a path-group (step 502).

Next, the system can optimize the logic gate based at least on the margin value (step 504). Specifically, the system can optimize the logic gate by applying a transformation to the logic gate which improves a non-timing metric without degrading timing at the output pin of the logic gate by an amount that is greater than the margin value. The non-timing metric can be indicative of an amount of area required by the circuit design, an amount of leakage power consumed by the circuit design, and/or an amount of electrical design rule violations in the circuit design.

The system can use the margin values associated with the output pin of a logic gate in a number of ways. Recall that an output pin can have multiple margin values that are associated with different timing end-point/path-group pairs. In one technique, the system can select a transformation based on the minimum margin value, i.e., the system can ensure that applying the transformation will not violate any of the margins for the output pin. In another approach, the system can select a transformation that does not violate only certain margins, e.g., the margin values for the output pin associated with a particular path-group. Once the system uses the margin values to select a transformation in the local context, the system can then try the transformation in larger contexts, e.g., within a zone or within a global context. Additionally, in some embodiments, the margin values for a pathgroup at a pin can be calculated as the difference between the slacks for that pathgroup at that pin and the worst-case slack for that pathgroup across the entire design. Note that the worst-case slack for a pathgroup may be associated with a timing end-point that is not be affected by the slack at the pin under consideration.

Figure 6:
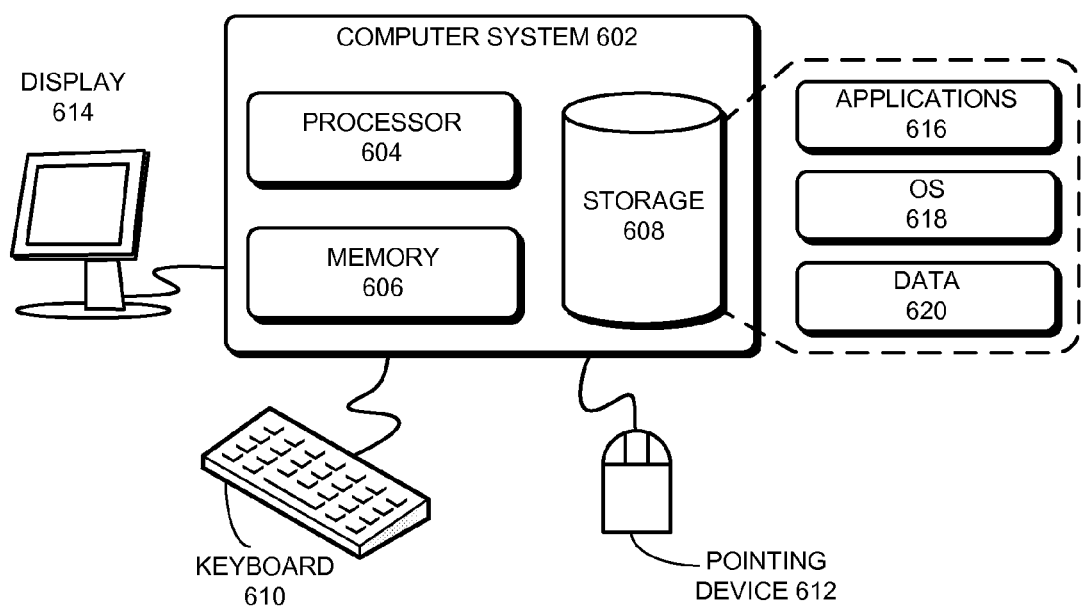
FIG. 6 illustrates a computer system in accordance with some embodiments of the present invention.

FIG. 6 illustrates a computer system in accordance with some embodiments of the present invention.

Computer system 602 can include a processor 604, a memory 606, and a storage device 608. Computer system 602 can be coupled to a display device 614, a keyboard 610, and a pointing device 612. Storage device 608 can store operating system 618, applications 616, and data 620.

Applications 616 can include instructions, which when executed by computer system 602 can cause computer system 602 to perform methods and/or processes described in this disclosure. Data 618 can include any data that is required as input or that is generated as output by the methods and/or processes described in this disclosure.

Figure 7:
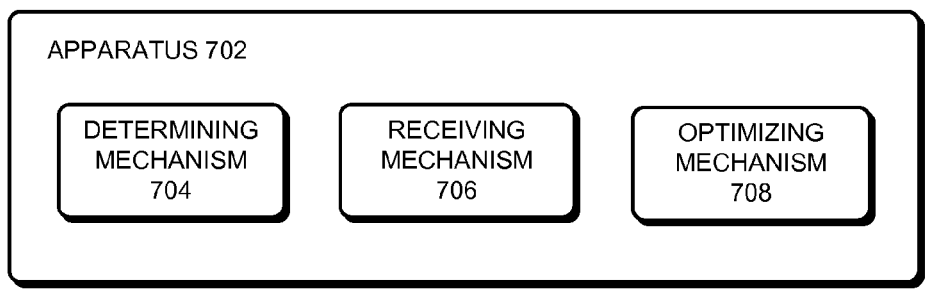
FIG. 7 illustrates an apparatus in accordance with some embodiments of the present invention.

FIG. 7 illustrates an apparatus in accordance with some embodiments of the present invention.

Apparatus 702 can comprise a plurality of mechanisms which may communicate with one another via a wired or wireless communication channel. Apparatus 702 may be realized using one or more integrated circuits, and apparatus 702 may include fewer or more mechanisms than those shown in FIG. 7. Further, apparatus 702 may be integrated in a computer system, or it may be realized as a separate device which is capable of communicating with other computer systems and/or devices.

Specifically, apparatus 702 can include determining mechanism 704, receiving mechanism 706, and optimizing mechanism 708. Determining mechanism 704 can be configured to determine arrival times, required times, slack values, and/or margin values. In some embodiments, determining mechanism 704 may comprise multiple mechanisms, such as an arrival-time-determining mechanism, a required-time-determining mechanism, a slack-determining mechanism, and a margin-determining mechanism. Receiving mechanism 706 can be configured to receive margin values. Optimizing mechanism 708 can be configured to use the margin values to optimize logic gates in the circuit design.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. In an electronic design automation (EDA) tool in a computer, a method for determining margin values, the method comprising:
   determining, by the EDA tool in the computer, an arrival time at an output pin of a logic gate;
   determining, by the EDA tool in the computer, a set of required times at the output pin of the logic gate, wherein each required time in the set of required times is determined by propagating required times from timing endpoints backward to the output pin of the logic gate, and wherein each required time in the set of required times is associated with a timing end-point in a path-group;
   determining, by the EDA tool in the computer, a first set of slack values at the output pin of the logic gate by computing a difference between each required time in the set of required times and the arrival time;
   determining, by the EDA tool in the computer, a second set of slack values for a set of timing end-points, wherein the set of timing end-points does not include the output pin of the logic gate, wherein each slack value in the second set of slack values is determined by computing a difference between a required time at a timing end-point in the set of timing end-points and an arrival time at the timing end-point that was propagated forward to the timing end-point;
   determining, by the EDA tool in the computer, a set of margin values at the output pin of the logic gate, wherein each margin value is determined by computing a difference between a first slack value in the first set of slack values and a second slack value in the second set of slack values; and
   optimizing, by the EDA tool in the computer, the logic gate based on the set of margin values.

2. The method of claim 1, wherein determining the arrival time includes determining a maximum arrival time in a set of arrival times which is propagated forward from a set of input pins of the logic gate to the output pin of the logic gate.

3. The method of claim 1, wherein determining a required time associated with a timing end-point in a path-group at the output pin of the logic gate includes determining a minimum required time in a set of fan-out required times associated with the timing end-point in the path-group, wherein the set of fan-out required times is propagated backward from a set of fan-out gates electrically coupled to the output pin of the logic gate.

4. The method of claim 1, wherein a timing end-point is an input of a register or a primary output, and wherein a timing start-point is an output of a register or a primary input.

5. The method of claim 1, wherein the method further comprises determining a minimum margin value in the set of margin values.

6. A non-transitory computer-readable storage medium storing instructions of an electronic design automation (EDA) tool that, when executed by a computer, cause the computer to perform a method for determining margin values, the method comprising:
   determining an arrival time at an output pin of a logic gate;
   determining a set of required times at the output pin of the logic gate, wherein each required time in the set of required times is determined by propagating required times from timing endpoints backward to the output pin of the logic gate, and wherein each required time in the set of required times is associated with a timing end-point in a path-group;
   determining a first set of slack values at the output pin of the logic gate by computing a difference between each required time in the set of required times and the arrival time;
   determining a second set of slack values for a set of timing end-points, wherein the set of timing end-points does not include the output pin of the logic gate, wherein each slack value in the second set of slack values is determined by computing a difference between a required time at a timing end-point in the set of timing end-points and an arrival time at the timing end-point that was propagated forward to the timing end-point;
   determining a set of margin values at the output pin of the logic gate, wherein each margin value is determined by computing a difference between a first slack value in the first set of slack values and a second slack value in the second set of slack values; and
   optimizing the logic gate based on the set of margin values.

7. The non-transitory computer-readable storage medium of claim 6, wherein determining the arrival time includes determining a maximum arrival time in a set of arrival times which is propagated forward from a set of input pins of the logic gate to the output pin of the logic gate.

8. The non-transitory computer-readable storage medium of claim 6, wherein determining a required time associated with a timing end-point in a path-group at the output pin of the logic gate includes determining a minimum required time in a set of fan-out required times associated with the timing end-point in the path-group, wherein the set of fan-out required times is propagated backward from a set of fan-out gates electrically coupled to the output pin of the logic gate.

9. The non-transitory computer-readable storage medium of claim 6, wherein a timing end-point is an input of a register or a primary output, and wherein a timing start-point is an output of a register or a primary input.

10. The non-transitory computer-readable storage medium of claim 6, wherein the method further comprises determining a minimum margin value in the set of margin values.

11. A method for using margin values to optimize a circuit design, the method comprising:
   receiving a set of margin values for an output pin of a logic gate in the circuit design, wherein each margin value is associated with a timing end-point in a path group, wherein each margin value is indicative of an amount of timing degradation at the output pin which is unobservable at the associated timing end-point in the path-group, wherein each margin value is a difference between two slack values at two different pins in the circuit design, wherein each slack value is a difference between an arrival time and a required time at a given pin in the circuit design, and wherein arrival times are propagated from timing start-points to timing end-points and required times are propagated from timing end-points to timing start-points; and optimizing, by computer, the logic gate based at least on the set of margin values.

12. The method of claim 11, wherein optimizing the logic gate includes:

determining a minimum margin value in the set of margin values; and applying a transformation to the logic gate which improves a non-timing metric without degrading timing at the output pin of the logic gate by an amount that is greater than the minimum margin value.

13. The method of claim 12, wherein the non-timing metric is indicative of an amount of area required by the circuit design.

14. The method of claim 12, wherein the non-timing metric is indicative of an amount of leakage power consumed by the circuit design.

15. The method of claim 12, wherein the non-timing metric is indicative of an amount of electrical design rule violations in the circuit design.

16. A non-transitory computer-readable storage medium storing instructions that, when executed by a computer, cause the computer to perform a method for using margin values to optimize a circuit design, the method comprising:

receiving a set of margin values for an output pin of a logic gate in the circuit design, wherein each margin value is associated with a timing end-point in a path group, wherein each margin value is indicative of an amount of timing degradation at the output pin which is unobservable at the associated timing end-point in the path-group, wherein each margin value is a difference between two slack values at two different pins in the circuit design, wherein each slack value is a difference between an arrival time and a required time at a given pin in the circuit design, and wherein arrival times are propagated from timing start-points to timing end-points and required times are propagated from timing end-points to timing start-points; and optimizing the logic gate based at least on the set of margin values.

17. The non-transitory computer-readable storage medium of claim 16, wherein optimizing logic gate includes:

determining a minimum margin value in the set of margin values; and applying a transformation to the logic gate which improves a non-timing metric without degrading timing at the output pin of the logic gate by an amount that is greater than the minimum margin value.

18. The non-transitory computer-readable storage medium of claim 17, wherein the non-timing metric is indicative of an amount of area required by the circuit design.

19. The non-transitory computer-readable storage medium of claim 17, wherein the non-timing metric is indicative of an amount of leakage power consumed by the circuit design.

20. The non-transitory computer-readable storage medium of claim 17, wherein the non-timing metric is indicative of an amount of electrical design rule violations in the circuit design.

* * * * *